(12) United States Patent
Ottinger et al.

(10) Patent No.: US 6,515,459 B1
(45) Date of Patent: Feb. 4, 2003

(54) APPARATUS AND METHOD FOR EFFECTING CONTROLLED START UP OF A PLURALITY OF SUPPLY VOLTAGE SIGNALS

(76) Inventors: George T. Ottinger, 1508 Home Park Dr., Allen, TX (US) 75002; John Randall Principe, 2709 Knights Bridge Dr., Rowlett, TX (US) 75088; David B. Rosenbluth, 7 Doral Pl., Richardson, TX (US) 75080; Marco Antonio Davila, Jr., 4754 N. Coop Canyon Pl., Tucson, AZ (US) 85750

( * ) Notice: Subject to any disclaimer, the term of this patent is extended or adjusted under 35 U.S.C. 154(b) by 0 days.

(21) Appl. No.: 10/044,885

(22) Filed: Jan. 11, 2002

(51) Int. Cl.[7] .................................................. G05F 1/40
(52) U.S. Cl. ........................................ 323/269; 323/280
(58) Field of Search ................................. 323/268, 269, 323/271, 272, 273, 275, 279, 280, 282, 285

(56) References Cited

U.S. PATENT DOCUMENTS 5,731,692 A * 3/1998 Garcia ........................ 323/274
6,160,446 A * 12/2000 Azimi et al. .................. 330/69
6,316,970 B1 * 11/2001 Hebert ........................ 327/67

* cited by examiner

Primary Examiner—Matthew Nguyen
(74) Attorney, Agent, or Firm—Law Office of Donald D. Mondul

(57) ABSTRACT

An apparatus for controlling start up of supply voltages received from a power supply responding to control by a feedback signal includes: (a) first error amplifiers receiving a supply voltage at a first terminal, receiving a reference voltage at a second terminal and providing a first error signal to a switch indicating difference between the signals at the terminals; and (b) second error amplifiers having a first node coupled with the switch and for receiving the supply voltage and a second node receiving a reference voltage; the first node receives a sum of the first error signal and the supply voltage when the switch is in a first orientation, and receives the supply voltage when the switch is in a second orientation; each second error amplifier provides a second error signal indicating a difference between signals received at the nodes that is the feedback signal for controlling the power supply.

20 Claims, 6 Drawing Sheets

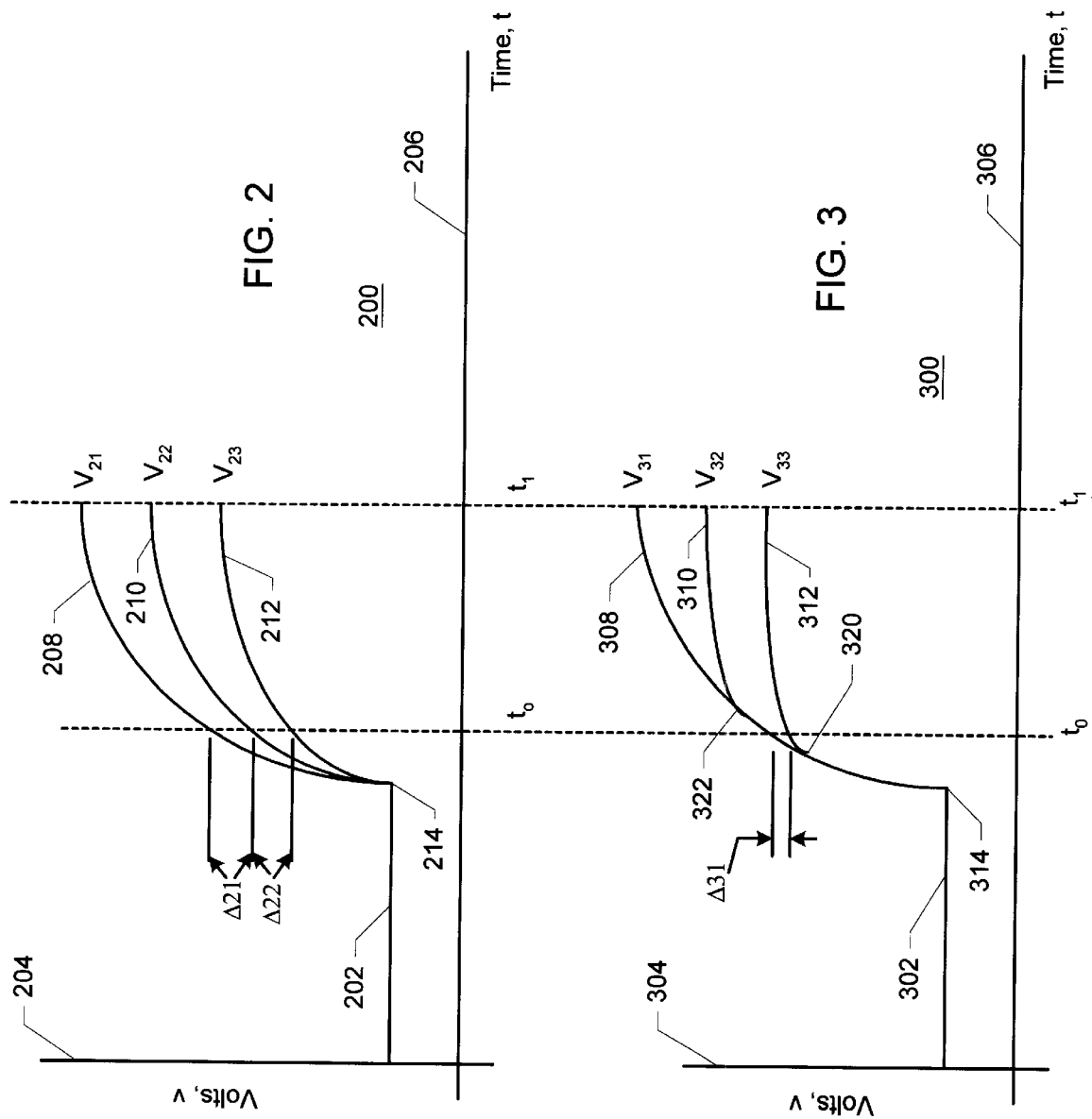

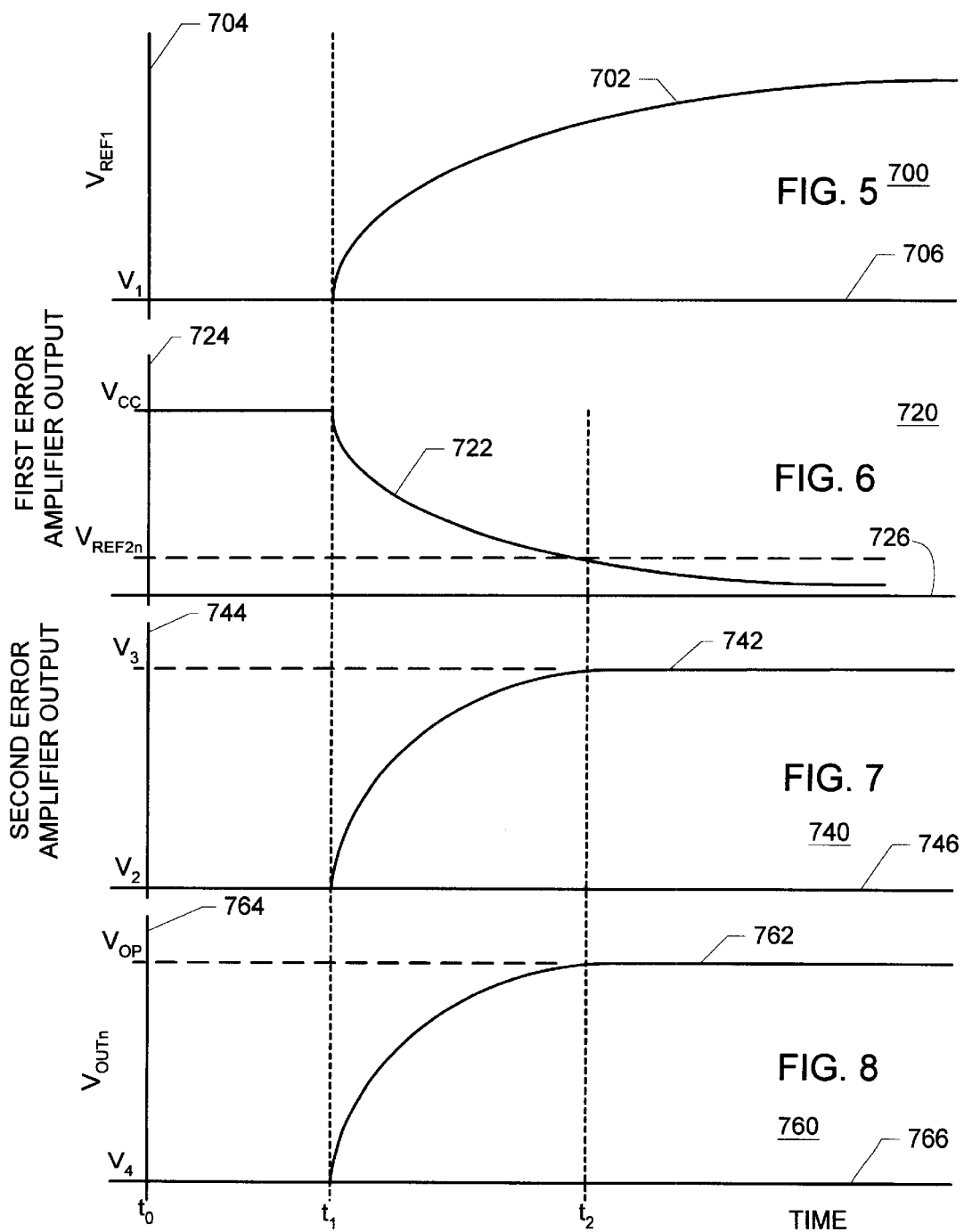

APPARATUS AND METHOD FOR EFFECTING CONTROLLED START UP OF A PLURALITY OF SUPPLY VOLTAGE SIGNALS

BACKGROUND OF THE INVENTION

The present invention is directed to operation of power supply apparatuses, and especially to start up operations of power supply apparatuses involving a plurality of supply voltage signals.

By way of example, and not by way of limitation, there are DC-DC converter products that use a variety of different supply voltages in different portions of the circuitry. In such products it is sometimes important to carefully control start up of the device, and hence start up of the power supplied for the device. It is important to ensure that the various voltages are provided in a controlled manner.

The apparatus and method of the present invention ensure that a variety of power supply portions of a power supply apparatus start up and deliver their respective voltages in a predetermined fashion. Specifically, the present invention ensures that the voltages rise together. The voltages follow a common reference signal to ensure that they track together toward their respective steady state supply levels.

Thus, the present invention is a control circuit for a multi-output power supply, or for outputs from multiple power supplies, for use during start up of the power supply.

Prior art power supplies provide an output voltage compensator circuit to track the output voltage and maintain it at a steady level as the load may change. A comparator is commonly employed in an output voltage compensator circuit for receiving a reference voltage at a first input terminal and receiving an output voltage of the power supply being controlled at a second input terminal. An error signal indicating the differences between the signals received at the two input terminals is typically used to drive a pulse width modulation circuit for controlling output of the power supply at a substantially constant steady state value. It is during the start up of the power supply while voltages are rising toward their respective steady state values that some products are at risk.

Prior art attempts to regulate start up of a power supply have typically focused on controlling ramp-up of the reference voltage provided at the first input terminal of the comparator in the output voltage compensator circuit. Prior art power supplies provide supply voltages to various portions of a product or to various devices in a product without coordination in a manner by which the various supply voltages proceed independently to reach their respective different steady state voltage supply levels at substantially the same time. As a result there is often an unacceptably large difference between voltage supply levels at a given time during start up.

There is a need for an apparatus and method for effecting a coordinated ramping up of supply voltages substantially together for various portions of a product or various devices in a product to operating levels.

SUMMARY OF THE INVENTION

An apparatus for effecting controlled start up of a plurality of supply voltage signals received from at least one power supply device responds to feedback control by at least one feedback signal in producing the plurality of supply voltage signals and includes: (a) a plurality of first error amplifier devices; each respective error amplifier device of the plurality of first error amplifier devices receives a respective supply voltage signal of the plurality of supply voltage signals at a first input terminal; each respective first error amplifier device receives a first reference voltage signal at a second input terminal; each respective first error amplifier device generates a respective first error output signal on a respective first output line; the respective first error output signal indicates a first difference between the respective supply voltage signal and the first reference voltage signal; each respective first error output line is coupled with a respective switching device; and (b) a plurality of second error amplifier devices; each respective error amplifier device of the plurality of second error amplifier devices has a first input node and a second input node; the first input node is coupled with the respective switching device and is coupled for receiving the respective supply voltage signal; the first input node receives a sum of the respective first error output signal and the respective supply voltage signal when the respective switching device is in a first operational orientation; the first input node receives the respective supply voltage signal when the respective switching device is in a second operational orientation; the respective second error amplifier device receives a second reference voltage at a second input node; the respective second error amplifier device provides a second error output signal indicating a second difference between signals received at the first input node and the second input node; the second error output signal is a respective feedback signal of the at least one feedback signal for effecting the feedback control of the at least one power supply device.

A method for effecting controlled start up of a plurality of supply voltage signals, the plurality of supply voltage signals being received from at least one power supply device responding to feedback control by at least one feedback signal in producing the plurality of supply voltage signals, includes the steps of: (a) providing a plurality of first error amplifier devices; each respective first error amplifier device of the plurality of first error amplifier devices receiving a respective supply voltage signal of the plurality of supply voltage signals at a first input terminal; each of the respective first error amplifier devices receiving a first reference voltage signal at a second input terminal; each of the respective first error amplifier devices generating a respective first error output signal on a respective first output line; the respective first error output signal indicating a first difference between the respective supply voltage signal and the first reference voltage signal; each of the respective first error output lines being coupled with a respective switching device; (b) providing a plurality of second error amplifier devices; each respective second error amplifier device of the plurality of second error amplifier devices having a first input node and a second input node; the first input node being coupled with the respective switching device and being coupled for receiving the respective supply voltage signal; the first input node receiving a sum of the respective first error output signal and the respective supply voltage signal when the respective switching device is in a first operational orientation; the first input node receiving the respective supply voltage signal when the respective switching device is in a second operational orientation; the respective second error amplifier device receiving a second reference voltage at a second input node; the respective second error amplifier device providing a second error output signal indicating a second difference between signals received at the first input node and the second input node; the second error output signal being a respective feedback signal of the at least one feedback signal for effecting the feedback control of the at least one power supply device; (c) establishing the respective switching device in the first operational orientation until the respective supply voltage signal rises to a predetermined value; and (d) establishing the respective switching device in the second operational orientation.

It is, therefore, an object of the present invention to provide an apparatus and method for effecting a coordinated ramping-up of supply voltages substantially together for various portions of a product or various devices in a product to operating levels.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 2 is a graphic representation of supply voltage as a function of time supplied by a prior art power supply apparatus.

FIG. 3 is a graphic representation of supply voltage as a function of time supplied by a power supply apparatus configured and operated according to the teachings of the present invention.

FIGS. 5–8 are graphic representations of various signals in the voltage compensation circuit illustrated in FIG. 4.

DETAILED DESCRIPTION OF THE PREFERRED EMBODIMENT

Figure 1:
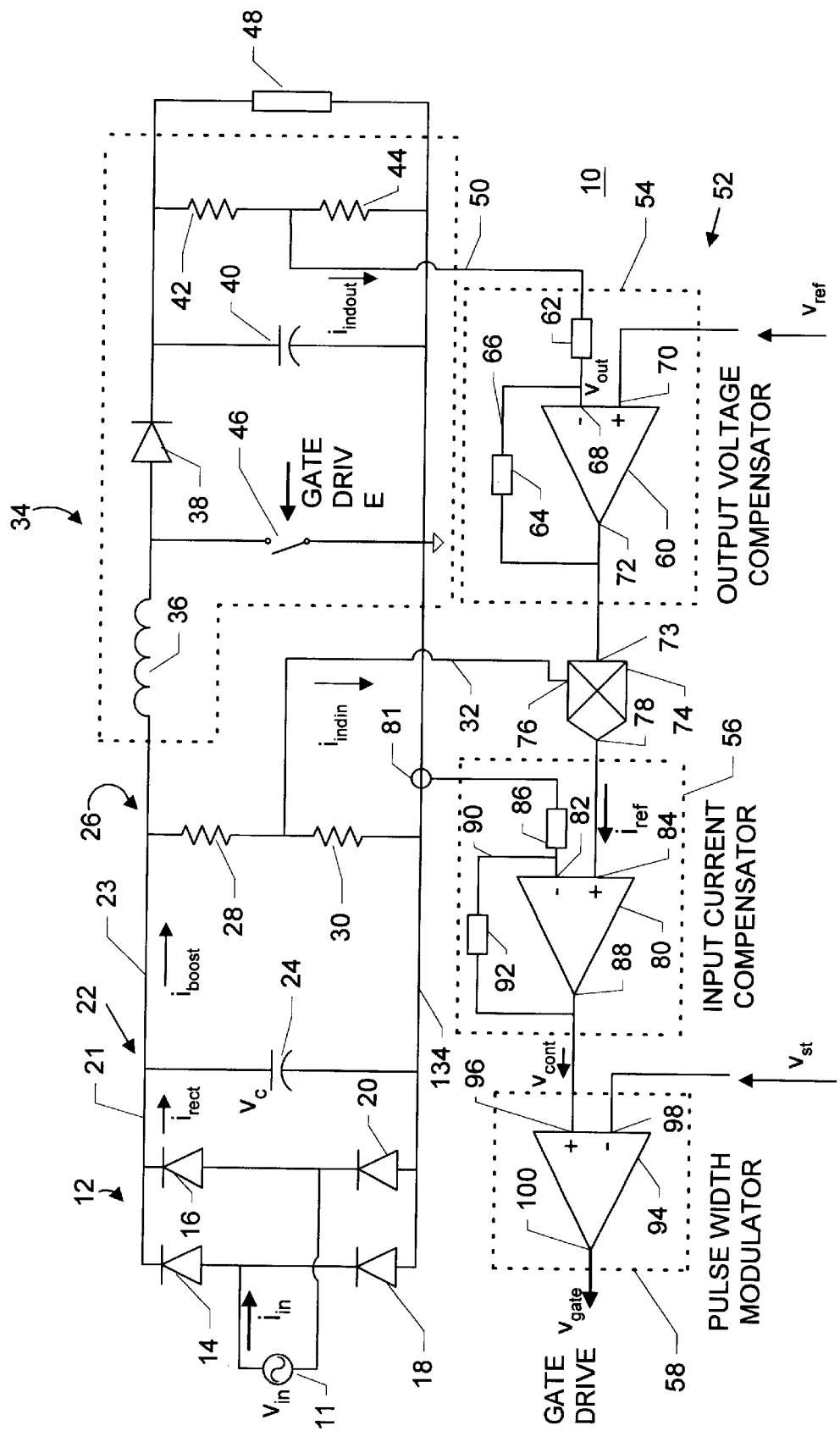
FIG. 1 is an electrical schematic diagram of a conventional prior art power factor correcting switched electrical converter.

FIG. 1 is an electrical schematic diagram of a conventional prior art power factor correcting switched electrical converter. In FIG. 1, an electrical converter 10 receives an alternating input having an alternating voltage $v_{in}$ with an alternating current $i_{in}$ from an alternating power source 11. A high-frequency electromagnetic interference (EMI) filter is usually included in the power source 11, but is not shown in FIG. 1. Converter 10 includes a rectifying circuit, or device, 12. Rectifying circuit 12 includes diodes 14, 16, 18, 20, preferably connected to effect full-bridge rectifying of the alternating input, as illustrated in FIG. 1. Rectifying circuit 12 produces a rectified input current $i_{rec}$ at a locus 21 of converter 10.

Electrical converter 10 further includes a filtering circuit, or device, 22. In the prior art converter 10 of FIG. 1, filtering circuit 22 comprises a capacitor 24 connected to filter a boost current iboost at a locus 23 which is produced by a boost converter 34 to get a smoother rectified input current $i_{rec}$ appearing at locus 21. An input voltage sensing circuit, or device, 26 comprises resistors 28, 30 arranged intermediate locus 23 and a line 134 (completing a circuit from a load 48 with rectifying circuit 12) in a voltage divider circuit configuration. Input voltage sensing circuit 26 produces an input-indicating signal $i_{indin}$ at an input-sensing node 32. Input-indicating signal $i_{indin}$ is a representation of a voltage $v_c$ across capacitor 24.

The boost converter 34 includes an inductor 36; a diode 38; a capacitor 40; resistors 42, 44, connected in a voltage divider circuit configuration intermediate capacitor 40 and line 134; and a switch 46. Boost converter 34 controls boost current $i_{boost}$ and output voltage across load 48; boost converter 34 delivers power to load 48. Resistors 42, 44 sense output voltage across load 48 and present an output-indicating signal $i_{indout}$ at an output-indicating node 50.

A feedback circuit, or device, 52 includes an output voltage compensator circuit 54, an input current compensator circuit 56, and a pulse width modulator circuit 58. Output voltage compensator circuit 54 comprises an operational amplifier 60 having an input impedance 62 and a feedback impedance 64 connected within a feedback loop 66. Operational amplifier 60 has an inverting input 68, a non-inverting input 70, and an output 72. Input impedance 62 is connected with inverting input 68. Feedback loop 66, including feedback impedance 64, connects output 72 with inverting input 68. Inverting input 68 is connected with output-indicating node 50 via input impedance 62, input impedance 62 receives output indicating signal $i_{idout}$ so output-indicating voltage $v_{out}$ is applied to inverting input 68 of output voltage compensator circuit 54. A reference voltage signal vref is applied to non-inverting input 70 of output voltage compensator circuit 54. The output signal from output voltage compensator circuit 54 produced at output 72 is provided at a first input 73 to a multiplier 74.

Multiplier 74 is connected with input-sensing node 32 and receives input-indicating signal $i_{indin}$ at a second input 76. An output 78 of multiplier 74 presents a reference signal $i_{ref}$ to input current compensator circuit 56. Reference signal $i_{ref}$ is a scaled version of input-indicating signal $i_{indin}$.

Input current compensator circuit 56 comprises an operational amplifier 80 having an inverting input 82, a non-inverting input 84, an input impedance 86, an output 88, and a feedback loop 90 connecting output 88 with inverting input 82. Feedback loop 90 includes a feedback impedance 92. Reference signal $i_{ref}$ is applied from output 78 of multiplier 74 to non-inverting input 84 of operational amplifier 80. In alternate embodiments of the apparatus (not illustrated herein) reference signal $i_{ref}$ may be connected via an impedance to inverting input 82 of operational amplifier 80. In the embodiment of converter apparatus 10 illustrated in FIG. 1, inverting input 82 of operational amplifier 80 receives, via input impedance 86, a current signal of rectifying circuit 12 from a current sensor 81 sensing current in line 134. Output 88 of operational amplifier 80 presents a control signal $v_{cont}$ to pulse width modulator circuit 58.

Pulse width modulator circuit 58 comprises a comparator 94 with a non-inverting input 96, an inverting input 98, and an output 100. Control signal $v_{cont}$ from input current compensator circuit 56 is received at non-inverting input 96. A sawtooth waveform $v_{st}$ is applied to inverting input 98, and a gating signal $v_{gate}$ is produced at output 100. In an alternate embodiment (not illustrated) pulse width modulator circuit 58 may be implemented as a leading edge modulator.

Gating signal $v_{gate}$ is applied to switch 46 (as indicated by the commonly labeled "GATE DRIVE" actuator arrows in FIG. 1), and thereby controls application of boost current $i_{boost}$ to load 48. That is, when gating signal $v_{gate}$ operates to open switch 46, boost converter 34 is appropriately connected within converter 10 to deliver boost current $i_{boost}$ to load 48. When gating signal $v_{gate}$ operates to close switch 46, boost converter 34 is reconfigured to charge the boost inductor and not to deliver boost current $i_{boost}$ to load 48.

Electrical converter 10 provides output voltage compensator circuit 54 to track output voltage $v_{out}$ provided to load 48 and to maintain output voltage $v_{out}$ at a steady level as load 48 may change. In regulating start up of electrical converter 10, attention is focused on controlling ramp up of signals appearing at output 72 of output voltage compensator circuit 54.

Today's products frequently require a plurality of different supply voltages within one package, and the supply voltages must be controlled within tight tolerances. Today's products often require close control over start up profiles and timing of initiation of various supply voltages within a product. Providing a plurality of supply voltages using a single converter apparatus with a plurality of output taps and relying upon controlling only one output voltage to keep all of the various output voltages from the various output taps within tolerances is not acceptably precise. In conventional systems, precisely providing a plurality of output voltages $v_{out1}$, $v_{out2}$, ... $v_{outn}$ involves using a plurality of parallel electrical converters such as electrical converter 10. In conventional systems controlling constant output voltage levels for output voltages $v_{out1}$, $v_{out2}$, ... $v_{outn}$ requires a plurality of output voltage compensator circuits operating in parallel. A problem with such a prior art arrangement is that there is no coordination among the various output voltage compensator circuits. Such a lack of coordination results in insufficiently precise control over which supply voltage is provided when, and insufficiently precise control over the start up profile exhibited by the various supply voltages.

FIG. 2 is a graphic representation of supply voltage as a function of time supplied by a prior art power supply apparatus. In FIG. 2, a plot 200 indicates output of a plurality of start-up control circuits similar to output voltage compensator circuit 54 (FIG. 1) configured for providing a plurality of supply voltage signals. A supply voltage curve 202 is plotted against an axis 204 indicating volts and an axis 206 indicating time. At a time preceding a first reference time to supply voltage begins to ramp up via separate curves 208, 210, 212 to approach respective operating voltage levels $V_{21}$, $V_{22}$, $V_{23}$ that are to be supplied. It is significant that supply voltage curves 208, 210, 212 depart from supply voltage curve 202 at a common locus 214. Of further significance is the variance among voltage curves 208, 210, 212 at first reference time to, as they traverse from locus 214 to their respective operating voltage levels $V_{21}$, $V_{22}$, $V_{23}$ at a common second reference time $t_1$. A difference Δ21 exists between curves 208, 210 at first reference time $t_0$. A difference Δ22 exists between curves 210, 212 at first reference time $t_0$. Such variances among supply voltages during start-up of a power supply apparatus are particularly troublesome when a power supply provides different input voltages substantially simultaneously to a single product. A product being provided such differing voltages may not operate properly. It is desirable to reduce differences among the various supply voltage signals during start-up as the supply voltages transition toward their respective operating levels. It is desirable to achieve greater uniformity of response among the various supply voltages provided by a multi-output power supply apparatus than may be provided by the prior art power supply illustrated in FIG. 3 when configured for multi-output operation.

FIG. 3 is a graphic representation of supply voltage as a function of time supplied by a power supply apparatus configured and operated according to the teachings of the present invention. In order to facilitate explaining the invention, FIGS. 2 and 3 are illustrated on a common time scale. In FIG. 3, a plot 300 indicates output of a plurality of start-up control circuits similar to output voltage compensator circuit 54 (FIG. 1) configured for providing a plurality of supply voltage signals using the apparatus and method of the present invention. A supply voltage curve 302 is plotted against an axis 304 indicating volts and an axis 306 indicating time. Axis 306 is substantially coincident in time with axis 206 (FIG. 2). At a time preceding a first reference time $t_0$ supply voltage 302 begins to ramp-up as indicated by supply voltage curves 308, 310, 312 to approach respective operating voltage levels $V_{31}$, $V_{32}$, $V_{33}$ that are to be supplied. It is significant that supply voltage curves 308, 310, 312 initially depart together from supply voltage curve 302 at a common locus 314. Respective supply voltages 308, 310, 312 diverge at different loci. Supply voltage curve 312 diverges from supply voltage curves 308, 310 at a locus 320 to traverse toward its operating value of $V_{33}$. Supply voltage curves 308, 310 diverge at a locus 322. Supply voltage curve 310 traverses from locus 322 toward its operating value $V_{32}$. Supply voltage curve 308 traverses from locus 322 toward its operating value $V_{31}$. Variance among voltage curves 308, 310, 312 at first reference time $t_0$ is reduced compared with variance among voltage curves 208, 210, 212 at time $t_0$ (FIG. 2). Voltage supply curve 312 has diverged from remaining voltage supply curves 308, 310 at first reference time $t_0$, but variance Δ31 between voltage supply curve 312 and voltage supply curves 308, 310 is reduced as compared with variance Δ22 between voltage supply curves 212, 210 (FIG.2). Voltage supply curves 308, 310 have not yet diverged at time $t_0$, so there is zero variance between voltage supply curves 308, 310 at time $t_0$. Such a reduction in variances among supply voltages during start-up of a power supply apparatus is valuable, especially when providing various power supply voltages to a single product.

Figure 4:
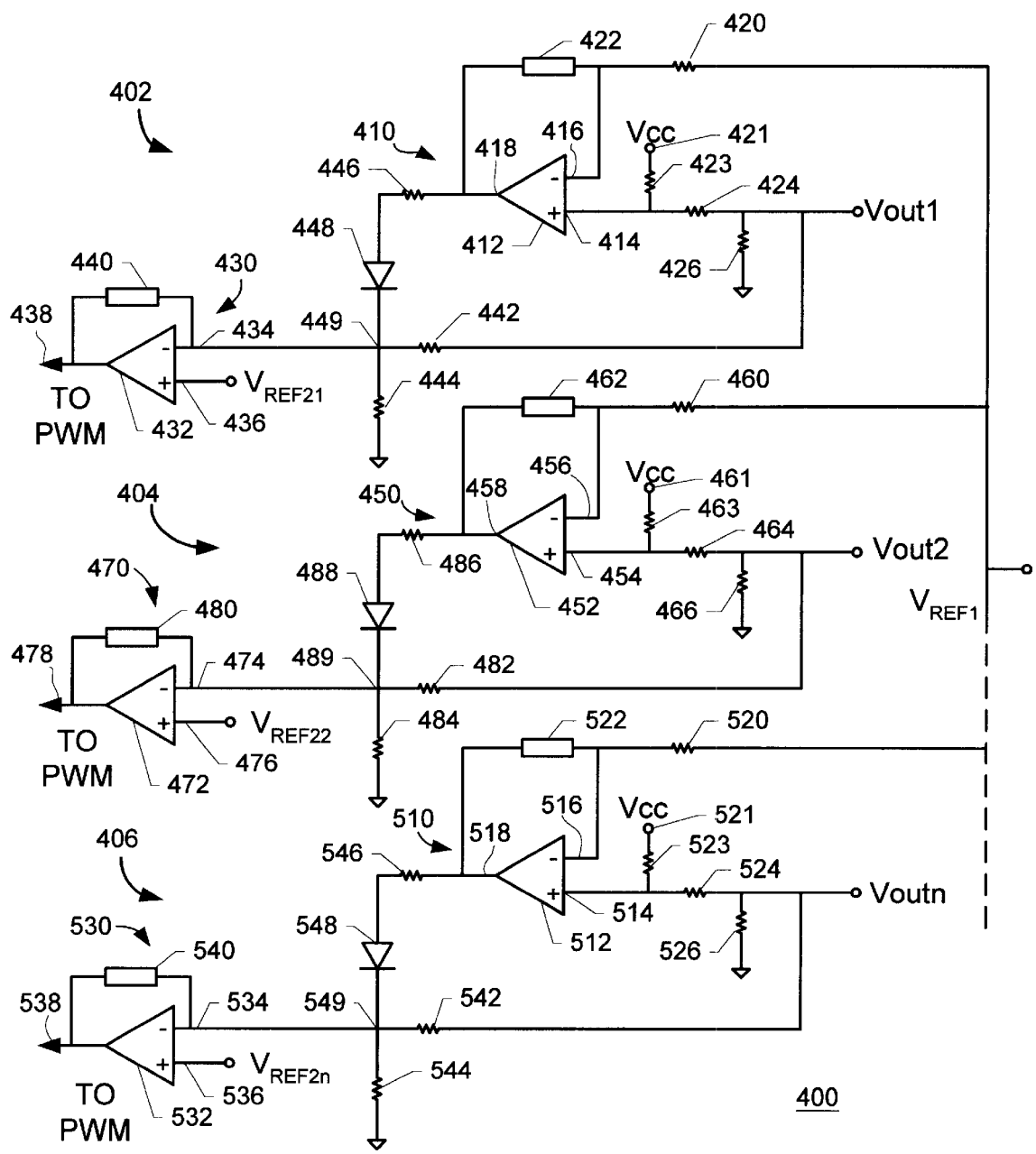
FIG. 4 is an electrical schematic diagram of a voltage compensation circuit for use with a power supply apparatus configured according to the teachings of the present invention.

FIG. 4 is an electrical schematic diagram of a voltage compensation circuit for use with a power supply apparatus configured according to the teachings of the present invention. In FIG. 4, a control apparatus 400 for effecting controlled start-up of a plurality of supply voltage signals includes a plurality of control circuits 402, 404, 406. Three control circuits for regulating three supply voltage signals are included in FIG. 4 by way of exemplary illustration only. The invention is not limited to controlling only three supply voltage signals.

Control circuits 402, 404, 406 are coupled in parallel and contain substantially the same components, but various individual components may have different operating parameters to accommodate different supply voltage signals to be controlled.

Control circuit 402 includes a first error amplifier 410. First error amplifier 410 includes an operational amplifier 412 having a non-inverting input 414, an inverting input 416 and an output 418. A first reference signal $V_{REF1}$ is applied to inverting input 414 via a load limiting impedance 420. A feedback impedance 422 is coupled between output 418 and inverting input 416 to configure operational amplifier 412 as an error amplifier. A first output voltage $V_{OUT1}$ which control circuit 402 is to seek to control is provided to non-inverting input 414. First output voltage $V_{OUT1}$ is scaled by a voltage divider circuit comprised of resistors 424, 426.

Control circuit 402 also includes a second error amplifier 430. Second error amplifier 430 includes an operational amplifier 432 having an inverting input 434, a non-inverting input 436 and an output 438. A second reference signal $V_{REF21}$ is applied to non-inverting input 436. A feedback impedance 440 is coupled between output 438 and inverting input 434 to configure operational amplifier 432 as an error amplifier. First output voltage $V_{OUT1}$ is provided to inverting input 434. First output voltage $V_{OUT1}$ is scaled by a voltage divider circuit comprised of resistors 442, 444.

Output 418 of first error amplifier 410 is provided via a load limiting resistor 446 and a diode 448 to a locus 449. When diode 448 is in a conducting state, signals provided from output 418 of first error amplifier 410 are added to first output voltage $V_{OUT1}$ at inverting input 434 of second error amplifier 430. When potential at locus 449 increases to a predetermined value, diode 448 is reverse biased and thereby rendered non-conductive so that only first output voltage $V_{OUT1}$ is applied to inverting input 434 of second error amplifier 430. Output 438 of second error amplifier 430 represents differences between signals applied at inverting input 434 and second reference voltage $V_{REF21}$. Signals appearing at output 438 are employed by "downstream" circuitry, including pulse width modulating circuitry (e.g., pulse width modulator circuit 58, FIG. 1), to adjust operation of the power supply apparatus being controlled for start-up to move first operating voltage toward its desired operating value.

Control circuit 404 includes a first error amplifier 450. First error amplifier 450 includes an operational amplifier 452 having a non-inverting input 454, an inverting input 456 and an output 458. First reference signal $V_{REF1}$ is applied to inverting input 454 via a load limiting impedance 460. A feedback impedance 462 is coupled between output 458 and inverting input 456 to configure operational amplifier 452 as an error amplifier. A second output voltage $V_{OUT2}$ which control circuit 404 is to seek to control is provided to non-inverting input 454. Second output voltage $V_{OUT2}$ is scaled by a voltage divider circuit comprised of resistors 464, 466.

Control circuit 402 also includes a second error amplifier 470. Second error amplifier 470 includes an operational amplifier 472 having an inverting input 474, a non-inverting input 476 and an output 478. A second reference signal $V_{REF22}$ is applied to non-inverting input 476. A feedback impedance 480 is coupled between output 478 and inverting input 474 to configure operational amplifier 472 as an error amplifier. Second output voltage $V_{OUT2}$ is provided to inverting input 474. Second output voltage $V_{OUT2}$ is scaled by a voltage divider circuit comprised of resistors 482, 484.

Output 458 of first error amplifier 450 is provided via a load limiting resistor 486 and a diode 488 to a locus 489. When diode 488 is in a conducting state, signals provided from output 458 of first error amplifier 450 are added to second output voltage $V_{OUT2}$ at inverting input 474 of second error amplifier 470. When potential at locus 489 increases to a predetermined value, diode 488 is reverse biased and thereby rendered non-conductive so that only second output voltage $V_{OUT2}$ is applied to inverting input 474 of second error amplifier 470. Output 478 of second error amplifier 470 represents differences between signals applied at inverting input 474 and second reference voltage $V_{REF22}$. Signals appearing at output 478 are employed by "downstream" circuitry, including pulse width modulating circuitry (e.g., pulse width modulator circuit 58, FIG. 1), to adjust operation of the power supply apparatus being controlled for start-up to move first operating voltage toward its desired operating value.

Control circuit 406 includes a first error amplifier 510. First error amplifier 510 includes an operational amplifier 512 having a non-inverting input 514, an inverting input 516 and an output 518. A first reference signal $V_{REF1}$ is applied to inverting input 514 via a load limiting impedance 520. A feedback impedance 522 is coupled between output 518 and inverting input 516 to configure operational amplifier 512 as an error amplifier. A third output voltage $V_{OUTn}$ which control circuit 406 is to seek to control is provided to non-inverting input 514. Third output voltage $V_{OUTn}$ is scaled by a voltage divider circuit comprised of resistors 524, 526. The annotation "n" indicates that any number of control circuits may be included in apparatus 400; three control circuits 402, 404, 406 are merely a representative number of control circuits.

Control circuit 406 also includes a second error amplifier 530. Second error amplifier 530 includes an operational amplifier 532 having an inverting input 534, a non-inverting input 536 and an output 538. A second reference signal $V_{REF2n}$ is applied to non-inverting input 536. A feedback impedance 540 is coupled between output 538 and inverting input 534 to configure operational amplifier 532 as an error amplifier. Third output voltage $V_{OUTn}$ is provided to inverting input 534. Third output voltage $V_{OUTn}$ is scaled by a voltage divider circuit comprised of resistors 542, 544.

Output 518 of first error amplifier 510 is provided via a load limiting resistor 546 and a diode 548 to a locus 549. When diode 548 is in a conducting state, signals provided from output 518 of first error amplifier 510 are added to third output voltage $V_{OUTn}$ at inverting input 534 of second error amplifier 530. When potential at locus 549 increases to a predetermined value, diode 548 is reverse biased and thereby rendered non-conductive so that only third output voltage $V_{OUTn}$ is applied to inverting input 534 of second error amplifier 530. Output 538 of second error amplifier 530 represents differences between signals applied at inverting input 534 and second reference voltage $V_{REF2n}$. Signals appearing at output 538 are employed by "downstream" circuitry, including pulse width modulating circuitry (e.g., pulse width modulator circuit 58, FIG. 1), to adjust operation of the power supply apparatus being controlled for start-up to move first operating voltage toward its desired operating value.

In its preferred embodiment, control apparatus 400 further provides a direct current (DC) offset voltage Vcc at inputs 414, 454, 514 of first error amplifiers 410, 450, 510 to ensure that each respective operational amplifier 412, 452, 512 starts at a HIGH state and transitions to a LOW state at the outset of its operation. This avoids spiking in signals at outputs 418, 458, 518, a signal response that will be described in connection with FIG. 9. It is preferred that the DC offset voltage be the same at each input 414, 454, 514 and that first reference voltage $V_{REF1}$ be applied to each inverting input 416, 456, 516 to ensure that signals at outputs 418, 458, 518 track together. This tracking together is manifested, for example, in the rising together of supply voltage curves 308, 310, 312 after initially departing together from supply voltage curve 302 at common locus 314 (FIG. 3).

Accordingly a DC offset voltage $V_{CC}$ is provided via a terminal 421 and a load limiting resistor 423 to non-inverting input 414 of first error amplifier 410. DC offset voltage $V_{CC}$ is also provided via a terminal 461 and a load limiting resistor 463 to non-inverting input 454 of first error amplifier 450. DC offset voltage $V_{CC}$ is further provided via a terminal 521 and a load limiting resistor 523 to non-inverting input 514 of first error amplifier 510.

An overview of operation of control apparatus 400: a common first reference voltage $V_{REF1}$ is applied to each inverting input 416, 456, 516 of first error amplifiers 410, 450, 510. Each respective output voltage $V_{OUT1}$, $V_{OUT2}$, $V_{OUTn}$ of the various power supplies sought to be controlled during start-up is applied to a respective non-inverting input 414, 454, 514 of a first error amplifier 410, 450, 510, respectively. Each first error amplifier 410, 450, 510 has its output coupled through a switching element (e.g., diodes 448, 488, 548) to the inverting input 434, 474, 534 of a second error amplifier 430, 470, 530, respectively. Each respective output voltage $V_{OUT1}$, $V_{OUT2}$, $V_{OUTn}$ is also coupled to a respective inverting input 434, 474, 534 of a second error amplifier 430, 470, 530. Both first error amplifiers 410, 450, 510 and second error amplifiers 430, 470, 530 are preferably biased and otherwise configured to operate as high gain circuits. Such a high gain configuration tends to urge the two inputs of respective first error amplifiers 410, 450, 510 and respective second error amplifiers 430, 470, 530 so that the differential between their respective inverting and non-inverting inputs is zero. The outputs of respective first error amplifiers 410, 450, 510 affect the input of respective second error amplifiers 430, 470, 530 until the switching elements (respective diodes 448, 488, 548) are reversed biased. After respective diodes 448, 488, 548, are reversed biased, only respective output voltages $V_{OUT1}$, $V_{OUT2}$, $V_{OUTn}$ control respective second error amplifiers 430, 470, 530.

Selection of the reverse breakdown voltages of diodes 448, 488, 548 and choices of resistors comprising voltage divider circuits adjacent loci 449, 489, 549 (i.e., resistors 442, 444, 482, 484, 542, 544) determine when respective output voltages $V_{OUT1}$, $V_{OUT2}$, $V_{OUTn}$ "break away" from influence by first reference signal $V_{REF1}$ so that only respective output voltages $V_{OUT1}$, $V_{OUT2}$, $V_{OUTn}$ are compared with respective second reference signals $V_{REF21}$, $V_{REF22}$, $V_{REF2n}$ for determining signals appearing at outputs 438, 478, 538 of second error amplifiers 430, 470, 530.

FIGS. 5–8 are graphic representations of various signals in the voltage compensation circuit illustrated in FIG. 4. In order to facilitate understanding the relationships among signals addressed in FIGS. 5–8, a common time scale is applied to the various time axes for FIGS. 5–8. In FIG. 5, a plot 700 includes a signal response curve 702 plotted against a voltage axis 704 and a time axis 706. Signal response curve 702 illustrates, for example, variance of first reference signal $V_{REF1}$ (FIG. 4) in volts as a function of time. Signal 702 is illustrated in this exemplary illustration as having an initial value $V_1$ during a time interval $t_0$–$t_1$ and departing in a positive direction from initial value $V_1$ at time $t_1$. It may be understood that time $t_1$ is the time at which control apparatus 400 (FIG. 4) initiates start-up control operation for a host power supply apparatus. First reference signal $V_{REF1}$ as illustrated in FIG. 5 (signal curve 702) is applied to inverting inputs 416, 456, 516 in control apparatus 400 (FIG. 4).

In FIG, 6, a plot 720 includes a signal response curve 722 plotted against a voltage axis 724 and a time axis 726. Time axis 726 is substantially in time-coincident register with time axis 706. Signal response curve 722 illustrates, for example, variance of signals appearing at outputs 418, 458, 518 of first error amplifiers 410, 450, 510 (FIG. 4). Signal response curve 722 is at a voltage level substantially equal to DC offset voltage $V_{CC}$ during the time interval $t_0$–$t_1$. At the onset of operation of control apparatus 400 (FIG. 4) at time $t_1$, signals at outputs 418, 458, 518 depart in a negative direction toward zero volts. At a time $t_2$, signal response curve 722 begins exhibiting values equal with or less than the respective second reference signal $V_{REF2n}$ that is applied to non-inverting inputs 436, 476, 536 of second error amplifiers 430, 470, 540 (FIG. 4). It is at about time $t_2$ that diodes 448, 488, 548 reverse bias and block application of output signals from outputs 418, 458, 518 to second error amplifiers 430, 470, 530. Selection of the reverse breakdown voltages of diodes 448, 488, 548 and choices of resistors comprising voltage divider circuits adjacent loci 449, 489, 549 (i.e., resistors 442, 444, 482, 484, 542, 544) determine the precise time at which respective output voltages $V_{OUT1}$, $V_{OUT2}$, $V_{OUTn}$ "break away" from influence by first reference signal $V_{REF1}$ so that only respective output voltages $V_{OUT1}$, $V_{OUT2}$, $V_{OUTn}$ are compared with respective second reference signals $V_{REF21}$, $V_{REF22}$, $V_{REF2n}$ for determining signals appearing at outputs 438, 478, 538 of second error amplifiers 430, 470, 530.

In FIG. 7, a plot 740 includes a signal response curve 742 plotted against a voltage axis 744 and a time axis 746. Time axis 746 is substantially in time-coincident register with time axes 706, 726. Signal response curve 742 illustrates variance of signals appearing at outputs 438, 478, 538 of second error amplifiers 430, 470, 530 (FIG. 4). Signal response curve 742 is at an initial voltage level $V_2$ during the time interval $t_0$–$t_1$. At the onset of operation of control apparatus 400 (FIG. 4) at time $t_1$, signals at outputs 438, 478, 538 depart in a positive direction toward value $V_3$. Value $V_3$ is an appropriate value for a signal at an output 438, 478, 538 for causing the power supply apparatus being controlled by control apparatus 400 (FIG. 4) to operate at a desired respective output voltage $V_{OUT1}$, $V_{OUT2}$, $V_{OUTn}$. At a time $t_2$, signal response curve 742 is substantially at value $V_3$.

In FIG. 8, a plot 760 includes a signal response curve 762 plotted against a voltage axis 764 and a time axis 766. Time axis 766 is substantially in time-coincident register with time axes 706, 726, 746. Signal response curve 762 illustrates variance of signals appearing at respective outputs of the power supply apparatus being controlled by control apparatus 400 (FIG. 4) and appearing in FIG. 4 as respective output voltages $V_{OUT1}$, $V_{OUT2}$, $V_{OUTn}$. Signal response curve 762 is at an initial voltage level $V_4$ during the time interval $t_0$–$t_1$. At the onset of operation of control apparatus 400 (FIG. 4) at time $t_1$, respective output voltages $V_{OUT1}$, $V_{OUT2}$, $V_{OUTn}$ depart in a positive direction toward their respective desired operating values, represented by value $V_{OP}$ in FIG. 8. At a time $t_2$, signal response curve 762 is substantially at operating value $V_{OP}$.

Figure 9:
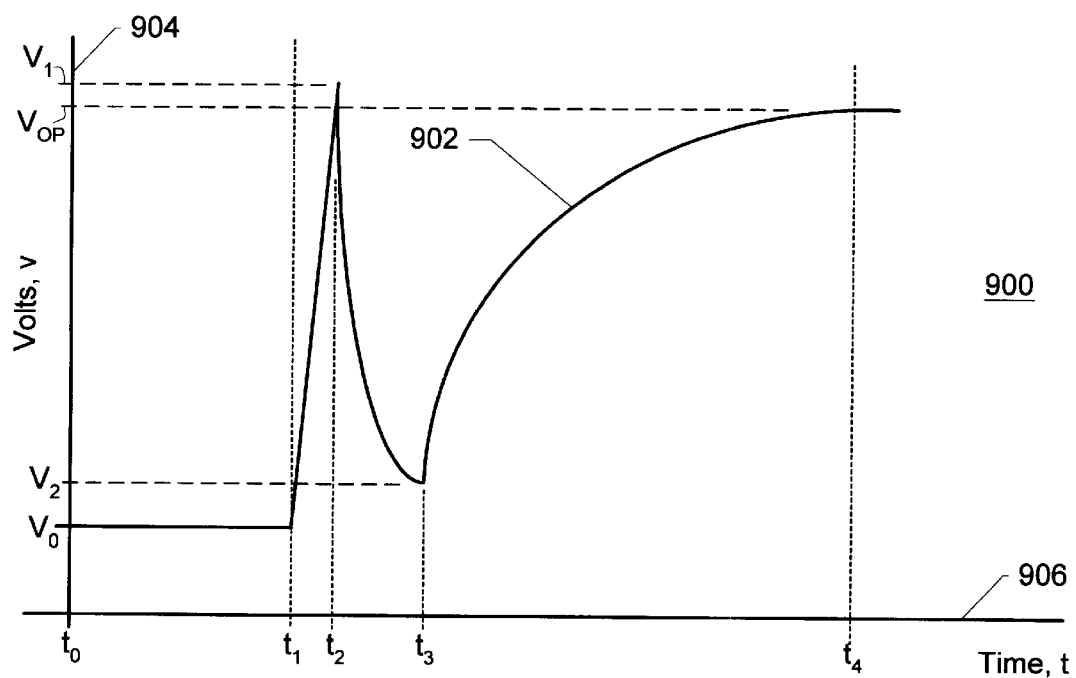
FIG. 9 is a graphic representation of output voltage as a function of time when an operational amplifier apparatus starts up from a low output level and transitions to a high output level.

FIG. 9 is a graphic representation of output voltage as a function of time when an operational amplifier apparatus starts up from a low output level and transitions to a high output level. In FIG. 9, a plot 900 includes a signal response curve 902 plotted against a voltage axis 904 and a time axis 906. Signal response curve 902 illustrates output signals that would appear at outputs 418, 458, 518 of first error amplifiers 410, 450, 510 (FIG. 4) in the absence of DC offset voltage $V_{CC}$ being applied at non-inverting inputs 414, 454, 514.

Signal response curve 902 is at an initial voltage level $V_0$ during the time interval $t_0$–$t_1$. At the onset of operation of control apparatus 400 (FIG. 4) at time $t_1$, signals at outputs 418, 458, 518 depart in a positive direction toward a peak value $V_1$. Signal response curve 902 remains only momentarily at value $V_1$ before departing negatively to a value $V_2$, thus establishing a sharp response departure, or signal spike, at a time $t_2$. Signal response curve 902 recovers from value $V_2$ almost immediately and increases to an operating voltage $V_{OP}$ sometime after a time $t_4$. Signal response curve 902 thus establishes a second sharp response departure at a time $t_3$. Such sharp response departures are disruptive and unpredictable in operating a control apparatus such as control apparatus 400 (FIG. 4). Such sharp response departures are substantially avoided by providing DC offset voltage $V_{CC}$ at non-inverting inputs 414, 454, 514.

Figure 10:
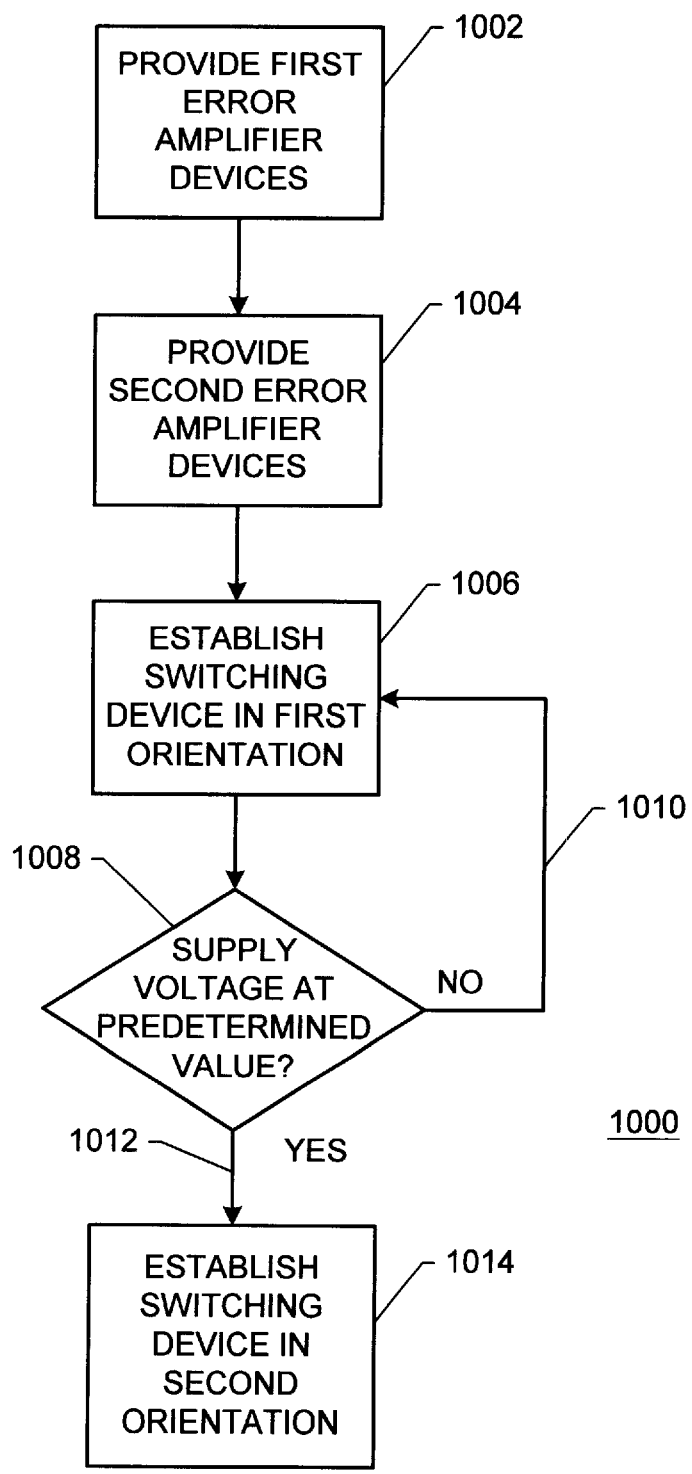
FIG. 10 is a flow diagram illustrating the method of the present invention.

FIG. 10 is a flow diagram illustrating the method of the present invention. In FIG. 10, a method 1000 for effecting controlled start up of a plurality of supply voltage signals received from at least one power supply device responding to feedback control by at least one feedback signal in producing the supply voltage signals is represented.

Method 1000 begins with a step of providing a plurality of first error amplifier devices, as indicated by a block 1002. Each respective first error amplifier device of the plurality of first error amplifier devices receives a respective supply voltage signal of the plurality of supply voltage signals at a first input terminal. Each respective first error amplifier device receives a first reference voltage signal at a second input terminal. Each respective first error amplifier device generates a respective first error output signal on a respective first output line indicating a first difference between the respective supply voltage signal and the first reference voltage signal. Each respective first error output line is coupled with a respective switching device.

Method 1000 continues with providing a plurality of second error amplifier devices, as indicated by a block 1004. Each respective second error amplifier device of the plurality of second error amplifier devices has a first input node and a second input node. The first input node is coupled with the respective switching device and is coupled for receiving the respective supply voltage signal. The first input node receives a sum of the respective first error output signal and the respective supply voltage signal when the respective switching device is in a first operational orientation. The first input node receives the respective supply voltage signal when the respective switching device is in a second operational orientation. The respective second error amplifier device receives a second reference voltage at a second input node. The respective second error amplifier device provides a second error output signal indicating a second difference between signals received at the first input node and the second input node. The second error output signal is a respective feedback signal of at least one feedback signal for effecting feedback control of at least one power supply device.

Method 1000 continues by establishing the respective switching device in the first operational orientation, as indicated by a block 1006. Method 1000 continues by posing a query, "Is the supply voltage at a predetermined value?", as indicated by a query block 1008. If the supply voltage is not at a predetermined value, method 1000 proceeds according to NO response line 1010 to continue operating in the configuration that was established by the step represented by block 1006. If the supply voltage has reached or exceeded the predetermined value, method 1000 proceeds according to YES response line 1012.

Method 1000 then continues by establishing the respective switching device in the second operational orientation, as indicated by a block 1014. The switching device remains in the second operational orientation until the power supply device is again exercised in a start-up operation.

The descriptions and discussions herein are exemplary and not limiting. The apparatus and method of the present invention is appropriate for and may be beneficially employed with any power supply or power converter that uses a feedback loop with an error amplifier and a reference. Appropriate power supplies and converters for employment of the present invention therefore include, for example, buck drive supplies, resonant supplies, quasi-resonant supplies, soft switching supplies and other similar power supplies and converters.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

We claim:

1. An apparatus for effecting controlled start up of a plurality of supply voltage signals; said plurality of supply voltage signals being received from at least one power supply device; said at least one power supply device responding to feedback control by at least one feedback signal in producing said plurality of supply voltage signals; the apparatus comprising:

(a) a plurality of first error amplifier devices; each respective first error amplifier device of said plurality of first error amplifier devices receiving a respective said supply voltage signal of said plurality of supply voltage signals at a first input terminal; each said respective first error amplifier device receiving a first reference voltage signal at a second input terminal; each said respective first error amplifier device generating a respective first error output signal on a respective first output line; said respective first error output signal indicating a first difference between said respective supply voltage signal and said first reference voltage signal; each said respective first error output line being coupled with a respective switching device;

(b) a plurality of second error amplifier devices; each respective second error amplifier device of said plurality of second error amplifier devices having a first input node and a second input node; said first input node of each second error amplifier device being coupled to one of said respective switching device and being coupled for receiving said respective supply voltage signal; said first input node receiving a sum of said respective first error output signal and said respective supply voltage signal when said respective switching device is in a first operational orientation; said first input node receiving said respective supply voltage signal when said respective switching device is in a second operational orientation; each said respective second error amplifier device receiving a second reference voltage at a second input node; said respective second error amplifier device providing a second error output signal indicating a second difference between signals received at said first input node and said second input node; said second error output signal being a respective feedback signal of said at least one feedback signal for effecting said feedback control of said at least one power supply device.

2. An apparatus for effecting controlled start up of a plurality of supply voltage signals as recited in claim 1 wherein said first reference voltage varies over time and wherein said second reference voltage is substantially constant over time.

3. An apparatus for effecting controlled start up of a plurality of supply voltage signals as recited in claim 1 wherein said respective first error amplifier also receives a direct current offset voltage signal at said first input terminal.

4. An apparatus for effecting controlled start up of a plurality of supply voltage signals as recited in claim 1 wherein said at least one power supply device is a plurality of power supply devices and wherein each respective power supply device of said plurality of power supply devices provides a respective supply voltage signal of said plurality of supply voltage signals.

5. An apparatus for effecting controlled start up of a plurality of supply voltage signals as recited in claim 4 wherein said at least one feedback signal is a plurality of feedback signals; each respective power supply device of said plurality of power supply devices receiving a respective feedback signal of said plurality of feedback signals for effecting said feedback control of said respective power supply device.

6. An apparatus for effecting controlled start up of a plurality of supply voltage signals as recited in claim 2 wherein said at least one power supply device is a plurality of power supply devices and wherein each respective power supply device of said plurality of power supply devices provides a respective supply voltage signal of said plurality of supply voltage signals.

7. An apparatus for effecting controlled start up of a plurality of supply voltage signals as recited in claim 6 wherein said at least one feedback signal is a plurality of feedback signals; each respective power supply device of said plurality of power supply devices receiving a respective feedback signal of said plurality of feedback signals for effecting said feedback control of said respective power supply device.

8. An apparatus for effecting controlled start up of a plurality of supply voltage signals as recited in claim 3 wherein said at least one power supply device is a plurality of power supply devices and wherein each respective power supply device of said plurality of power supply devices provides a respective supply voltage signal of said plurality of supply voltage signals.

9. An apparatus for effecting controlled start up of a plurality of supply voltage signals as recited in claim 8 wherein said at least one feedback signal is a plurality of feedback signals; each respective power supply device of said plurality of power supply devices receiving a respective feedback signal of said plurality of feedback signals for effecting said feedback control of said respective power supply device.

10. An apparatus for controlling initiation of a plurality of supply voltage signals from a plurality of power supply devices; the apparatus including a respective signal control module for each respective power supply device of said plurality of power supply devices; each said respective signal control module providing a control signal for controlling said respective power supply device to provide a respective said supply voltage signal of said plurality of supply voltage signals; each said respective signal control module comprising:

(a) a first error amplifier having a first input terminal for receiving said respective supply voltage signal, a second input terminal for receiving a first reference voltage signal, and an error output terminal for providing a first error output signal; said first error output signal representing a difference between said respective supply voltage signal and said first reference voltage signal;

(b) a switching device coupled with said first error output terminal for switchingly controlling said first error output signal;

(c) a second error amplifier device having a first input node for receiving a sum of said respective supply voltage signal and said first error output signal when said switching device is in a first operational orientation and receiving said respective supply voltage signal at said first input node when said switching device is a second operational orientation, a second input node for receiving a second reference voltage signal, and an error output terminal for providing a second error output signal; said second error output signal representing a difference between signals received at said first input node and said second input node; said second error output signal being said control signal.

11. An apparatus for controlling initiation of a plurality of supply voltage signals from a plurality of power supply devices as recited in claim 10 said first reference voltage varies over time and wherein said second reference voltage is substantially constant over time.

12. An apparatus for effecting controlled start up of a plurality of supply voltage signals as recited in claim 10 wherein said respective first error amplifier also receives a direct current offset voltage signal at said first input terminal.

13. An apparatus for controlling initiation of a plurality of supply voltage signals; said plurality of supply voltage signals being received from at least one power supply device; the apparatus including a respective signal control module for each respective supply voltage signal of said plurality of supply voltage signals; each said respective signal control module providing a control signal for controlling said at least one power supply device to provide a respective said supply voltage signal of said plurality of supply voltage signals; each said respective signal control module comprising:

(a) a first signal locus coupled for receiving said respective supply voltage signal;

(b) a first error amplifier device coupled with said first signal locus; said first error amplifier device receiving said respective supply voltage signal at a first input terminal; said first error amplifier receiving a first reference voltage signal at a second input terminal; said first error amplifier providing a first error output signal at a first error output terminal; said first error output signal representing a first difference between said respective supply voltage signal and said first reference voltage signal;

(c) a switching device coupled with said first error output terminal for switchingly controlling said first error output signal;

(d) a second signal locus coupled with said first signal locus for receiving said respective supply voltage; said second signal locus being coupled with said switching device for selectively receiving said first error output signal; and (e) a second error amplifier device coupled with said second signal locus; said second error amplifier device receiving a sum of said respective supply voltage signal and said first error output signal at a first input node when said switching device is in a first operational orientation; said second error amplifier device receiving said respective supply voltage signal at said first input node when said switching device is a second operational orientation; said second error amplifier receiving a second reference voltage signal at a second input node; said second error amplifier providing a second error output signal at a second error output terminal; said second error output signal representing a second difference between signals received at said first input node and said second input node; said second error output signal being said control signal.

14. An apparatus for controlling initiation of a plurality of supply voltage signals as recited in claim 13 wherein said first reference voltage varies over time and wherein said second reference voltage is substantially constant over time.

15. An apparatus for effecting controlled start up of a plurality of supply voltage signals as recited in claim 13 wherein said respective first error amplifier also receives a direct current offset voltage signal at said first input terminal.

16. An apparatus for controlling initiation of a plurality of supply voltage signals as recited in claim 13 wherein said at least one power supply device is a plurality of power supply devices and wherein each respective power supply device of said plurality of power supply devices provides a respective supply voltage signal of said plurality of supply voltage signals.

17. An apparatus for controlling initiation of a plurality of supply voltage signals as recited in claim 14 wherein said at least one power supply device is a plurality of power supply devices and wherein each respective power supply device of said plurality of power supply devices provides a respective supply voltage signal of said plurality of supply voltage signals.

18. An apparatus for controlling initiation of a plurality of supply voltage signals as recited in claim 15 wherein said at least one power supply device is a plurality of power supply devices and wherein each respective power supply device of said plurality of power supply devices provides a respective supply voltage signal of said plurality of supply voltage signals.

19. An apparatus for effecting controlled start up of a plurality of supply voltage signals as recited in claim 14 wherein said respective first error amplifier also receives a direct current offset voltage signal at said first input terminal.

20. A method for effecting controlled start up of a plurality of supply voltage signals; said plurality of supply voltage signals being received from at least one power supply device; said at least one power supply device responding to feedback control by at least one feedback signal in producing said plurality of supply voltage signals; the method comprising the steps of:

(a) providing a plurality of first error amplifier devices; each respective first error amplifier device of said plurality of first error amplifier devices receiving a respective said supply voltage signal of said plurality of supply voltage signals at a first input terminal; each said respective first error amplifier device receiving a first reference voltage signal at a second input terminal; each said respective first error amplifier device generating a respective first error output signal on a respective first output line; said respective first error output signal indicating a first difference between said respective supply voltage signal and said first reference voltage signal; each said respective first error output line being coupled with a respective switching device;

(b) providing a plurality of second error amplifier devices; each respective second error amplifier device of said plurality of second error amplifier devices having a first input node and a second input node; said first input node being coupled with said respective switching device and being coupled for receiving said respective supply voltage signal; said first input node receiving a sum of said respective first error output signal and said respective supply voltage signal when said respective switching device is in a first operational orientation; said first input node receiving said respective supply voltage signal when said respective switching device is in a second operational orientation; said respective second error amplifier device receiving a second reference voltage at a second input node; said respective second error amplifier device providing a second error output signal indicating a second difference between signals received at said first input node and said second input node; said second error output signal being a respective feedback signal of said at least one feedback signal for effecting said feedback control of said at least one power supply device;

(c) establishing said respective switching device in said first operational orientation until said respective supply voltage signal rises to a predetermined value; and (d) establishing said respective switching device in said second operational orientation.

\* \* \* \* \*